UNITED STATES PATENT OFFICE.

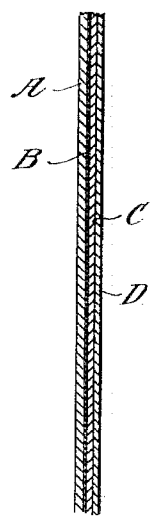

JOSEPH CHANTEUX, OF BRUSSELS, BELGIUM.

SCREEN FOR CINEMATOGRAPH PROJECTIONS AND OTHER SIMILAR PROJECTIONS.

1,315,708.　　　　　Specification of Letters Patent.　　Patented Sept. 9, 1919.

Application filed March 2, 1917. Serial No. 152,153.

*To all whom it may concern:*

Be it known that I, JOSEPH CHANTEUX, a subject of the King of Belgium, residing at Brussels, in the Kingdom of Belgium, have invented certain new and useful Improvements in Screens for Cinematograph Projections and other Similar Projections, of which the following is a specification.

This invention relates to a screen for cinematograph projections and other similar projections.

Screens for cinematograph projections and the like, as hitherto used, have generally been formed of a piece of white linen-cloth. Experiences have shown, however, that such a screen gives but a very bad distribution of light, causing in practice a great loss of light and consequently of electric energy.

Therefore, it has been proposed, in order to reduce the electric energy required by the source of light, to use metallized screens, that is to say screens in which the projecting surface is covered with a light-reflecting coating adapted to reduce the loss of light. Screens of this kind do not give either satisfactory results as indeed they do not secure a distribution of light corresponding to the several cases of the practice that is to say a repartition of light adequate—in each particular case—to the special dimensions of the room; generally speaking the pictures are confused, without relief and the contrast between the white and the black parts of the pictures is greatly diminished for the spectators whose visual rays fall upon the screen under an angle which is notably less than 90°.

On account of this inconvenience it has further been proposed to reduce the light-reflecting power of metallized screens by aid of a layer of glass pearls, said pearls being fixed upon the metallic coating by aid of a suitable adhesive. This expedient however has an important drawback as, indeed, the glass pearls produce on the surface of the screen a multiplicity of projections between which dust accumulates very rapidly in such a manner that, in a very short time, the screen is deprived of any efficient light-reflecting power.

One object of my invention is to avoid these inconveniences; another object is to secure, so to say, in each special case, surfaces of equal illuminating power adapted to utilize the whole space of the room in the best possible conditions. In other words my invention has for its object, while retaining the advantages of a metallized screen with a view of reducing the consumption of electric energy, to secure a better distribution of light than hitherto in such a manner that each spectator receives approximately the same quantity of light (in view of the dimensions of the room) without however that this advantage be annihilated by the inconveniences which are due to the use of screens coated with a rigid material forming prejudicial projections.

With this object in view my invention consists in combining in a screen the favorable effects of a light-reflecting material or medium with the special effects of a light-diffusing material or medium applied on the screen in a smooth and even coating. In these conditions the light-diffusing medium or material, without interfering with the principal qualities of the screen, reduces the action of the light-reflecting material or medium but increases the diffusion of light for the spectators who, otherwise, should be placed under an unfavorable angle relatively to the screen.

Further, it is possible, by a suitable repartition or distribution of the two materials, that is by their combination in special conditions, to reduce or to increase the effects of one or the other of the two materials and to secure a distribution of light specially adapted to each case.

In practice, such a combination of the two materials (light reflecting medium and light-diffusing medium) can be obtained by superposition or by the production of spots, streams or streaks by means of different coatings, said coatings being partly of light-reflecting material and partly of light-diffusing material.

In order to have my invention fully understood I will hereafter fully describe the several operations required for the preparation of a screen according to my invention.

In the accompanying drawing the figure thereof shows a fragmentary sectional view of a screen embodying my invention.

A piece of linen, A prepared as usual for oil painting is covered with a coating B of the following composition:

| | |
|---|---|
| Poppy oil | 0.5 liter. |
| Holland oil | 0.5 " |
| Siccative drier | 0.1 " |
| Venetian essential oil | 0.1 " |
| White lead ground with oil | 3 kgs. |
| Yellow ocher | 10 gr. |

This coating is applied with a brush and is then immediately plugged so as to remove any streak resulting from the application with the brush. Before complete drying of this layer, that is to say while it is still more or less sticking or adhering a light reflecting material or medium C such as aluminum powder for instance, or any other suitable metallic powder, is applied thereon in an even layer. When the metallic powder adheres firmly to the screen, after complete drying of the coating, a solution of a light-diffusing material or medium D is projected on the reflecting surface, for instance by aid of an atomizer, said solution being composed as an example of white gum and silver-white in the proportion of 25 gr. of white gum and of 5 to 25 gr. of silver-white for a liter of water.

The projection of this solution produces, upon the light reflecting coating, a kind of spotted deposit, the character of which varies with the duration of action of the atomizer. Spots of various forms or shapes and size can thus be produced on the surface of the screen. In this way various combinations of the effects of the light-reflecting material and of the light-diffusing material may be obtained.

As indicated, the layers of light reflecting and light-diffusing material are separately applied. In this way I am able to provide the screen with a reflecting surface which extends over the entire area of the screen, and which reflects substantially the entire quantity of light received from the projecting apparatus. But as the light necessarily passes through the layer of diffusing material, the rays are diffused and the strong glare is modified, and the light is transmitted from the screen in all directions. The images of the pictures projected upon the screen are thus clearly observable in all parts of the room or auditorium in which the screen is used, and by all beholders, irrespective of their angle of vision upon the screen.

It will be observed that the screen, which is thus produced is free from india-rubber and consequently from the well known inconveniences connected with the use of surfaces treated with india-rubber; the layer produced by the solution applied on the linen-cloth is diaphanous and possesses an ambered appearance having consequently a color which is complemental to the bluish-gray color of the metallic mixture. As a consequence, independently even of the peculiar effect due to the combination of the surfaces of the light-reflecting medium and of the light-diffusing medium with regards to the distribution of light, the parts of the pictures which are illuminated, are perfectly white. On the other hand, the dark parts of the pictures are perfectly black on account of the grayish color of the screen whereas the white parts scintillate in the light; the contrasts are very pronounced and give a perfect relief to the pictures.

My invention is obviously not restricted to the special compositions of coatings hereinbefore described. Instead of the products which have been cited, other equivalent products can be used if they are adapted to give similar results. Thus, for instance, in the first layer or coating for the light-reflecting medium, the poppy oil, which is used in order to facilitate the use of Holland oil, could be replaced by another oil securing the same result.

Further, instead of yellow ocher, any other material having a similar color, could also be used. The combination of the two materials (the light-reflecting medium and the light-diffusing medium) could also be produced in any other manner. As an example, the reflecting material (metallic powder) could be applied on the first layer or coating in the form of a pasty coating. This can be obtained by mixing aluminum powder, for instance in the proportion of 100 grs. with the following composition:

| | |
|---|---|
| Brown varnish | 0.200 lit. |
| Siccative drier | 0.300 " |
| Turpentine | 0.300 " |

The paste, thus produced, is applied with a brush and then immediately plugged. The light-diffusing coating is then applied as already described by means of an atomizer. In certain cases, the light-reflecting coating could also be applied in the form of spots, streams or streaks upon a layer of light-diffusing medium or this latter could be applied in the form of a uniform and transparent layer upon the coating of light-reflecting medium. The base upon which the layers or coatings are applied need not necessarily be a linen-cloth. Any other suitable base could also be used without departing from the scope of my invention provided said base be covered by superposed layers of a light-reflecting material or medium and of a light-diffusing material or medium, giving to the screen a smooth and even surface.

What I claim is:

1. A screen for cinematograph and similar projections, comprising a base, a coating of light reflecting material applied to the face of said base, and a second coating of light diffusing material independently applied to said coating of reflecting material in the form of spots or streaks.

2. A screen for cinematograph and similar projections, comprising a base, a coating of light reflecting material applied to the face of said base, and a smooth coating of light diffusing material applied to the face of the first said coating in the form of spots or streaks.

3. A screen for cinematograph and similar projections comprising a base, a layer of metal powder applied to said base by a paint-like coating of a color which is complemental to the color of the metal powder, and a smooth coating of light diffusing material superposed on said layer of metal powder.

4. A screen for cinematograph and similar projections comprising a cloth base prepared as usual for oil painting, a layer of metal powder applied to said base by a coating of oil, siccative drier and coloring matter which is complemental to the color of the metal powder, and a coating of light diffusing material over the layer of metal powder.

5. A screen for cinematograph and similar projections, comprising a base, a layer of metal powder applied to said base, by paint-like coating of a color which is complemental to the color of the metal powder, and a smooth coating of light diffusing material applied to the layer of metal powder in the form of spots or streaks.

6. A screen for cinematograph and similar projections comprising a cloth base prepared as usual for oil paintings, the said base having a coating thereon composed of Holland oil, siccative drier and yellow ocher and having a metallic powder applied to said coating to produce a light-reflecting surface, and a light-diffusing coating composed of white gum and silver white applied to the light-reflecting surface in the form of spots or streaks.

In testimony whereof I have affixed my signature in presence of two witnesses.

JOSEPH CHANTEUX.

Witnesses:
  JACQUES BEDY,
  C. R. VASMITH.